US010221735B2

United States Patent
Butler et al.

(10) Patent No.: US 10,221,735 B2
(45) Date of Patent: Mar. 5, 2019

(54) METHOD OF REAL-TIME OIL CONSUMPTION DETECTION

(71) Applicant: United Technologies Corporation, Hartford, CT (US)

(72) Inventors: Steven Butler, Columbia, CT (US); Sean McCutchan, Glastonbury, CT (US); Reade James, West Hartford, CT (US); Denman James, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 380 days.

(21) Appl. No.: 14/954,563

(22) Filed: Nov. 30, 2015

(65) Prior Publication Data

US 2017/0152776 A1 Jun. 1, 2017

(51) Int. Cl.

| F01M 11/10 | (2006.01) |
|---|---|
| G01F 9/00 | (2006.01) |
| G01F 23/00 | (2006.01) |
| F01M 11/12 | (2006.01) |
| G01M 15/09 | (2006.01) |
| G05B 23/02 | (2006.01) |

(52) U.S. Cl.
CPC .......... *F01M 11/10* (2013.01); *F01M 11/12* (2013.01); *G01F 9/00* (2013.01); *G01F 23/0061* (2013.01); *G01M 15/09* (2013.01); *G05B 23/0221* (2013.01); *G05B 23/0254* (2013.01); *F16N 2270/20* (2013.01)

(58) Field of Classification Search
CPC ....... F01M 11/10; G01F 23/0061; G01F 9/00; G03G 15/2025; G03G 2215/2093
USPC ............ 702/45, 47, 55, 96, 98, 104; 73/291
See application file for complete search history.

(56) References Cited

U.S. PATENT DOCUMENTS

| 8,103,462 B2 * | 1/2012 | Liu | .................. G01M 15/09 |
| | | | 702/47 |
| 2004/0079150 A1 * | 4/2004 | Breed | .................. B60J 10/00 |
| | | | 73/291 |

* cited by examiner

*Primary Examiner* — John H Le
(74) *Attorney, Agent, or Firm* — Snell & Wilmer, L.L.P.

(57) ABSTRACT

A method of real-time oil consumption is disclosed. A method of real-time oil consumption detection may include capturing a raw oil quantity, calculating a corrected oil quantity, calculating a predicted oil quantity, calculating a prediction error, and calculating an estimated oil consumption rate. Raw oil quantity may be captured from an oil quantity sensor in an engine. Corrected oil quantity may be calculated by taking raw oil quantity and applying environmental and engine operational conditions. Prediction error may be calculated by finding the difference between corrected oil quantity and predicted oil quantity. Oil consumption rate may be calculated by applying a regression algorithm to prediction error.

19 Claims, 3 Drawing Sheets

METHOD OF REAL-TIME OIL CONSUMPTION DETECTION

FIELD

The present disclosure relates generally to oil consumption detection, and more specifically, to real-time oil consumption detection in aircrafts.

BACKGROUND

Effective aircraft oil level monitoring is often confounded by limited sensor precision, the motion of oil in the tank during maneuvers, and the effects of oil "gulping" during changes in engine power demands. These effects may be accommodated to some extent through modeling. Such models perform strongly during stable engine and aircraft operation, but due to the complex nature of these influences, correction quality can be reduced during periods of transient operation. This reduced accuracy may result in greater false alarms during transient operation or reduced sensitivity and effectiveness during normal operation, amongst other problems.

SUMMARY

In various embodiments, a system for oil consumption monitoring may comprise an oil quantity sensor and a processor. Oil quantity sensor may be configured to monitor raw oil quantity on an aircraft. Processor may be configured to receive raw oil quantity from oil quantity sensor, calculate a corrected oil quantity, calculate a predicted oil quantity, calculate a prediction error, and calculate an oil consumption rate. Corrected oil quantity may be calculated by taking raw oil quantity and applying engine operational and environmental conditions. Prediction error may be calculated by finding the difference between corrected oil quantity and predicted oil quantity. Oil consumption rate may be calculated by applying a regression algorithm to prediction error.

In various embodiments, a method of oil consumption detection may comprise capturing a raw oil quantity, calculating a corrected oil quantity, calculating a predicted oil quantity, calculating a prediction error, and calculating an estimated oil consumption rate. Raw oil quantity may be captured from an oil quantity sensor in an engine. Corrected oil quantity may be calculated by a processor, by taking raw oil quantity and applying engine operational and environmental conditions. Prediction error may be calculated by a processor, by finding the difference between corrected oil quantity and predicted oil quantity. Oil consumption rate may be calculated by a processor, by applying a regression algorithm to prediction error.

In various embodiments, a computer-based system may comprise a processor and a tangible, non-transitory computer readable medium. Tangible, non-transitory computer readable medium may be configured to communicate with processor. Tangible, non-transitory computer readable medium may have stored instructions that, in response to execution by processor, cause processor to perform operations. Processor may receive from an oil quantity sensor a raw oil quantity in an engine. Processor may calculate a corrected oil quantity. Processor may calculate a predicted oil quantity. Processor may calculate a prediction error by comparing the corrected oil quantity to the predicted oil quantity. Processor may calculate an estimated oil consumption rate by applying a regression algorithm to the prediction error.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

Figure 1:
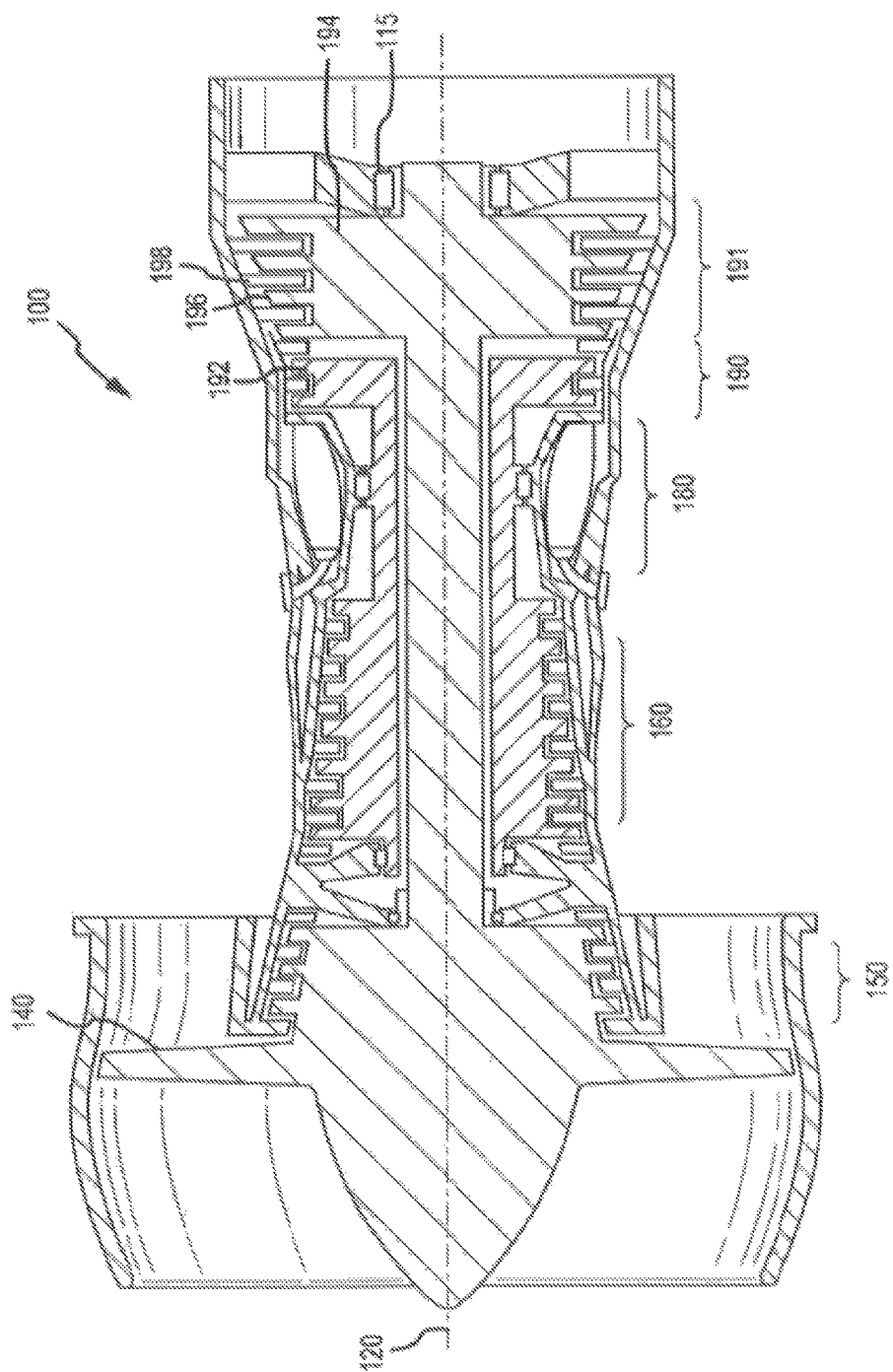
FIG. 1 illustrates a gas turbine engine, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

During aircraft flight, real-time oil level monitoring is often made more difficult and complex by limited oil sensor precision, the motion of oil in the tank during transient periods of operation, and the effects of oil "gulping" (i.e., an increase in the amount of oil in circulation) during changes in engine power demands. As an example, when the aircraft is accelerating down the runway, the oil in the tank may slosh, thus impacting the amount of oil detected by the oil quantity sensor. As the aircraft begins to climb in elevation, the angle of inclination likewise may change the amount of oil detected by the oil quantity sensor. Likewise, operational factors such as the ambient pressure outside the engine, the speed of the engine, and the temperature at which different components of the engine are operating may affect how much oil is held in the oil system outside the tank.

Historically, it has been difficult to compensate for such factors, among others, to provide an accurate measurement of the amount of oil in an oil tank during operation, especially during non-steady states such as during take-off.

Principles from the current disclosure may be used to improve real-time oil level monitoring. In various embodiments, the current disclosure may improve the approach to oil level monitoring by weighting the oil consumption rate inversely proportional to an estimate of engine and aircraft stability. In various embodiments, this disclosure may provide dynamically reduced sensitivity in transitions between nominal, quasi-steady state conditions and transient conditions. Moreover, principles of the present disclosure may also decrease the detection time for changes in oil to less than 15 minutes, according to various embodiments.

In various embodiments, and with reference to FIG. 1, a gas turbine engine 100 (such as a turbofan gas turbine engine) is illustrated. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. The fan 140 may drive air into compressor sections 150, 160, which may further drive air along a core flow path for compression and communication into the combustion section 180. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of applications and to all types of turbine engines, including turbofan gas turbine engines and turbojet engines.

Figure 2:
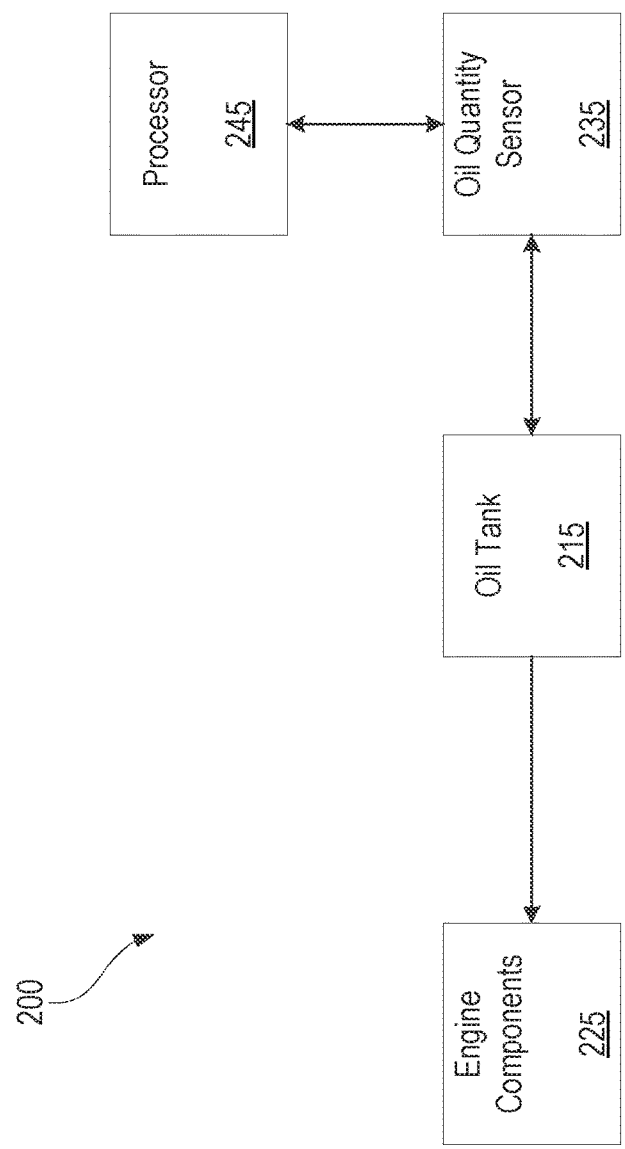
FIG. 2 illustrates a block diagram for an oil monitoring system for a gas turbine engine, in accordance with various embodiments.

In various embodiments, and with reference to FIG. 2, an oil monitoring system 200 for a gas turbine engine is disclosed. Oil system 200 may comprise an oil tank 215, engine components 225, an oil quantity sensor 235, and a processor 245. Oil system 200 may be configured to provide oil from the oil tank 215 to engine components 225 of a gas turbine engine. Oil tank 215 may be any type of oil tank suitable to hold oil for an oil system 200. A pump may be used to circulate oil from oil tank 215 to engine components 225 and back to oil tank 215. Though configured as an oil circuit, it is understood that, during operation, oil will be consumed. The rate at which engine components 225 consume oil changes over time. FIG. 2 provides a general understanding of the sections in an oil system, and is not intended to limit the disclosure. The present disclosure may extend to all types of applications and to all types of oil systems.

Oil quantity sensor 235 may comprise any type of sensor suitable to capture raw oil quantity from oil tank 215. In various embodiments, multiple oil quantity sensors 235 may be used. Oil quantity sensor 235 may be located in any location suitable to capture raw oil quantity, such as, for example, within an oil system 200 for a gas turbine engine. In this regard, oil quantity sensor 235 may be located within, or in close proximity to, oil tank 215. Oil quantity sensor 235 may be configured to capture raw oil quantity data at any suitable frequency rate. Oil quantity sensor 235 may be configured to output measurements at a frequency rate of 1 Hz and, in various embodiments, from 0.2 Hz to 10 Hz and from 0.5 Hz to 5 Hz.

Oil quantity sensor 235 may be configured to send data on raw oil quantity to a processor 245. Processor 245 may be any suitable processor that can receive data from oil quantity sensor 230. In this regard, processor 245 may be located onboard an aircraft and/or located externally from an aircraft. Processor 245 may be configured to be located within the aircraft's full authority digital engine control ("FADEC"). Processor 245 may also be configured to be located within the aircraft's health monitoring systems. Processor 245 may be configured to perform all the calculations necessary to monitor oil consumption. Processor 245 may also be configured to execute instructions loaded onto a tangible, non-transitory computer readable medium, causing processor 245 to perform various operations.

Figure 3:
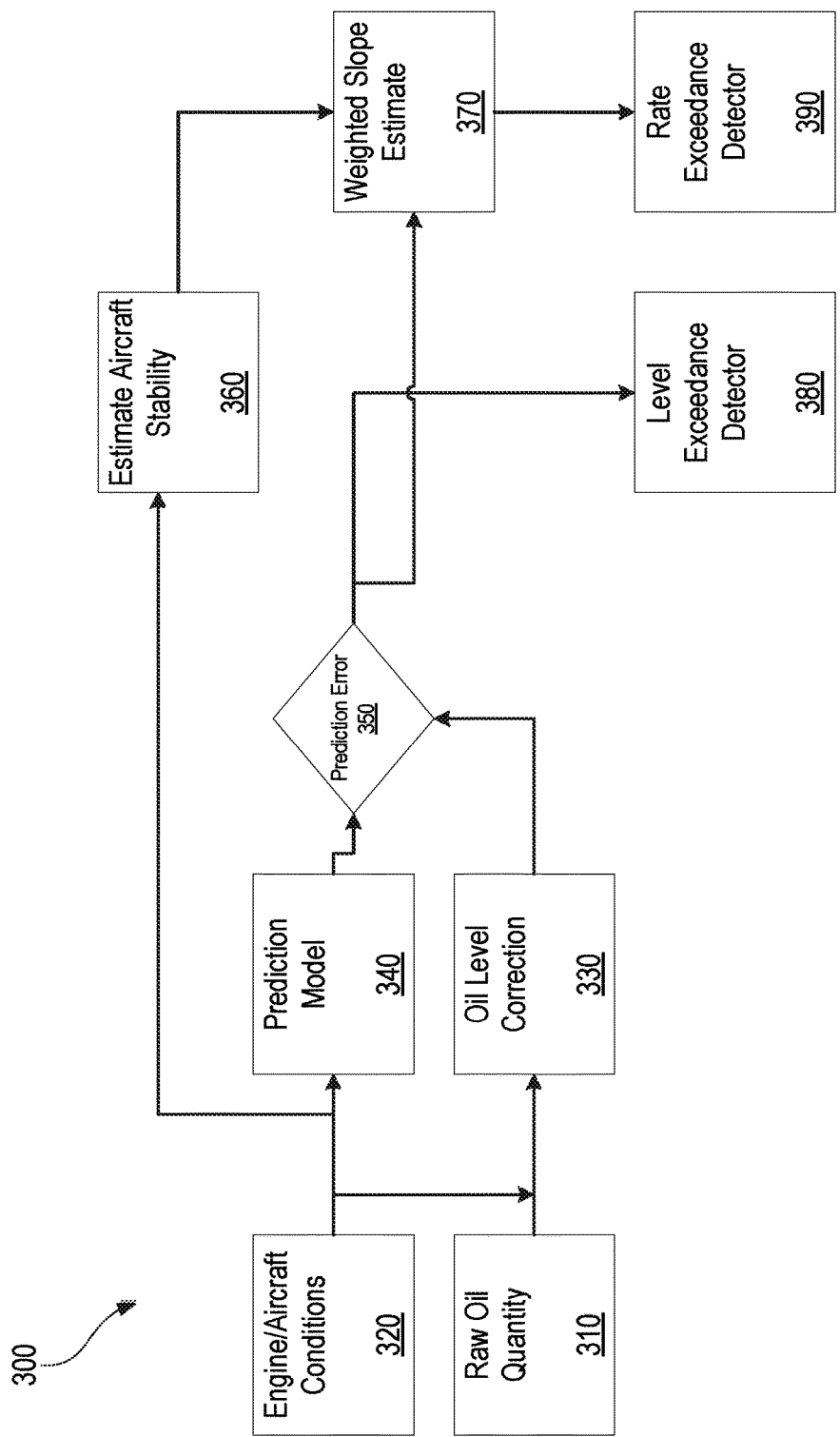
FIG. 3 illustrates a flow chart of a method for real-time oil consumption detection, in accordance with various embodiments.

In various embodiments, and with reference to FIG. 3, a method 300 for real-time oil consumption monitoring is disclosed. Method 300 may comprise capturing raw oil quantity 310, capturing engine operating parameter measurements and aircraft conditions 320, calculating a corrected oil quantity 330, calculating a predicted oil quantity 340, calculating a prediction error 350, calculating an aircraft stability estimate 360, and calculating a weighted slope estimate 370. Method 300 may also comprise alerting a level exceedance detector 380, and/or alerting a rate exceedance detector 390.

In various embodiments, and with further reference to FIGS. 2 and 3, a raw oil quantity 310 may be captured. Raw oil quantity 310 may comprise data from an oil tank 215 relating to the raw amount of oil currently located in the oil tank 215. In this regard, raw oil quantity 310 may represent the amount of oil currently located in the oil tank 215 and not the total amount of oil in the oil system. Raw oil quantity 310 may be captured by any suitably accurate method or means. In this regard, raw oil quantity 310 may be captured from the engine, by an oil quantity sensor 235. It is understood that the raw oil quantity 310 as read by oil quantity sensor 235 is subject to variations due to engine operation conditions and other environmental factors. Thus, the raw oil quantity 310 may not be accurate at various points in time. Raw oil quantity 310 may then be sent from oil quantity sensor 235 to processor 245.

In various embodiments, data on engine operating parameter measurements and aircraft conditions 320 may be monitored and captured. Engine operating parameter measurements and aircraft conditions 320 may be monitored by any method suitable to monitor and capture data. Data regarding engine operating parameter measurements 320 may be monitored and captured within a gas turbine engine. Data regarding aircraft conditions 320 may be monitored and measured from the airframe of the aircraft.

Engine operating parameter measurements 320 may comprise any data relating to a gas turbine engine of an aircraft. For example, engine operating parameter measurements 320 may comprise data on engine rotor speeds, ambient pressure outside the engine, the RPM at which the turbofan is operating, the temperature at which the engine is operating, and/or the like. Aircraft conditions 320 may comprise any data relating to the airframe of the aircraft. For example, aircraft conditions 320 may comprise data on altitude, acceleration of the aircraft, stability of the aircraft, the angle of inclination of the aircraft, and/or the like. It should be appreciated that the actual parameters may vary with engine architecture.

Data regarding engine operating parameters, measurements and aircraft conditions 320 may be configured to be sent to a processor 245. The processor may be configured to use the data regarding engine operating parameters and aircraft conditions 320 in the process of correcting oil quantity 330, calculating a predicted oil quantity 340, calculating an aircraft stability estimate 360, and/or for any other suitable use.

In various embodiments, an oil level correction 330 may be calculated by correcting raw oil quantity 310. Whereas raw oil quantity 310 represents the oil level in oil tank 215 as physically measured by oil quantity sensor 230, corrected oil quantity 330 may represent the actual current oil level of the engine after accounting for environmental factors and/or operating conditions. Corrected oil quantity 330 may be calculated by any suitable means of calculation. Corrected oil quantity 330 may be used by the processor 245 to calculate a prediction error 350.

Corrected oil quantity 330 may be calculated by taking raw oil quantity 310 and applying factors and conditions of the aircraft that are happening in real time. Raw oil quantity 310 may be corrected using any suitable factors and conditions. In this regard, raw oil quantity 310 may be corrected to account for environmental factors by using engine operating parameters, measurements and aircraft conditions 320.

In various embodiments, a predicted oil quantity 340 may be calculated. Predicted oil quantity 340 may represent what the current oil level on an aircraft is expected to be based upon a predetermined model of oil consumption, without any consideration to physical measurement, such as by the oil quantity sensor. Predicted oil quantity 340 may be implemented based on a physics model or an empirically derived model. Predicted oil quantity 340 may be calculated by any suitable means of calculation. In this regard, predicted oil quantity 340 may be calculated by processor 245. Predicted oil quantity 340 may be used by processor 245 for any suitable use, such as, for example, calculating a prediction error 350.

Predicted oil quantity 340 may be calculated based on a variety of factors. In this regard, predicted oil quantity 340 may be calculated by inputting engine operating parameters, measurements and aircraft conditions 320, and/or other suitable operating parameters into a physics model or an empirically derived model. Based on this prediction model, predicted oil quantity 340 may be used to predict what the current oil level on an aircraft should be, when considering the operating conditions of the aircraft.

In various embodiments, a prediction error 350 may be calculated. Prediction error 350 may represent the difference between what the current oil level on an aircraft is expected to be, and what the current oil level on the aircraft actually is. Prediction error 350 may be calculated as the difference between corrected oil quantity 330 and predicted oil quantity 340. Prediction error 350 therefore may represent an unexpected reduction in oil quantity levels during flight. Prediction error 350 may be calculated by any suitable means of calculation, such as, for example, by processor 245. 245 Processor may be configured to use prediction error 350 for any suitable use, such as to calculate a weighted slope estimate 370, and/or to implement a level exceedance detector 380.

In various embodiments, an aircraft stability estimate 360 may be calculated. Aircraft stability estimate 360 may represent the current stability of the aircraft during transient operating conditions. Aircraft stability estimate 360 may be calculated using any suitable methods and/or means, such as, for example, by processor 245.

Aircraft stability estimate 360 may be evaluated using a plurality of approaches including weighted statistics, fuzzy logic, or empirically trained networks. Aircraft stability estimate 360 may be calculated by using any suitable factors. In this regard, aircraft stability estimate 360 may be calculated using engine operating parameters, measurements and aircraft conditions 320, and/or other suitable operating parameters. Aircraft stability estimate 360 may therefore be used as an estimate for the current transient conditions of the aircraft.

In various embodiments, a weighted slope estimate 370 may be calculated to determine the real-time oil consumption. Weighted slope estimate 370 may be calculated using any suitable methods and/or means, such as, for example, by using processor 245. Weighted slope estimate 370 may be used in an exponential average to smooth the prediction error 350. During transient flight conditions, prediction error 350 may be less accurate because the readings from oil quantity sensor 230 are going to be less reliable. Weighted slope estimate may therefore be used to smooth prediction error 350 by giving greater weight to prediction error 350 during times when an aircraft is in a steady-state condition, and lesser weight to prediction error during times when an aircraft is in a transient condition. For example, during transient flight conditions, weighted slope estimate 370 may be less, and during steady-state flight conditions the weighted slope estimate 370 may be more.

After weighted slope estimate 370 is calculated, it may be used to determine the oil consumption rate, both the instantaneous rate and the rate over a given time period. Weighted slope estimate 370 may be calculated in real time, with each data point adding to the result of the prior one, calculating an updated slope and estimate. Oil consumption rate may be used to represent a real-time measurement of the rate of oil consumption in the gas turbine engine. Oil consumption rate may be calculated by applying a regression algorithm to prediction error 350, weighting the influence of individual points using the inverse of an aircraft stability estimate 360. Oil consumption rate may be calculated in real time, with each data point adding to the results of the prior one, calculating an updated slope and estimate. Oil consumption rate may also be calculated after an aircraft flight or simulation.

In various embodiments, a rate exceedance detector 390 may be implemented. Rate exceedance detector 390 may be a preferred detection means, implemented in parallel with level exceedance detector 380. Rate exceedance detector 390 may be implemented to generate a rate alert when oil consumption rate is outside a defined threshold. Defined threshold to generate a rate alert may vary depending on the particular engine model on the aircraft. In various embodiments, and as an example, a rate alert may be generated any time weighted slope estimate 370 is outside defined threshold of −1.0 quarts per an hour. A rate alert may also be generated any time weighted slope estimate 370 is outside a defined threshold of −2.0 quarts per an hour, −4.0 quarts per an hour, −0.5 quarts per an hour, and/or at any other suitable and/or desired defined threshold.

Processor may be configured to generate a rate alert when the weighted slope estimate 370 is outside a defined threshold. Rate alert may trigger an alarm, notify a pilot, be transmitted to the ground for fleet monitoring and tracking, and/or be used for any other suitable response. Rate exceedance detector 390 may also be implemented using a plurality of basic and empirical approaches.

In various embodiments, a level exceedance detector 380 may be implemented. Level exceedance detector 380 may be used as a parallel alerting approach with rate exceedance detector 390. In this regard, level exceedance detector 380 may be used to create an alert for a low oil level even if the oil consumption rate never exceeds the predetermined value. Level exceedance detector 380 may be configured to detect a problem with a relatively long period prior to the oil level dropping below a minimum value, while tending to reduce the number of false positive results. During extended transient periods of operation, such as when an aircraft is making maneuvers or during periods of heavily turbulent conditions, the rate of oil consumption may become less sensitive. During that time period, level exceedance detector 380 may be used to generate a level alert when the prediction error 350 is outside a defined threshold. The defined threshold to generate a level alert may vary depending on the particular engine model on the aircraft. In various embodiments, and as an example, level exceedance detector 380 may generate a level alert when the prediction error 350 is outside defined threshold of −3 quarts for 120 consecutive seconds. Level exceedance detector 380 may also generate a level alert when prediction error 350 is outside defined threshold of −2 quarts for 120 consecutive seconds, −4 quarts for 120 consecutive seconds, and/or at any other suitable and/or desired defined threshold.

The processor may be configured to generate a level alert when prediction error 350 is outside a defined threshold. Level alert may alert avionics, trigger an alarm, notify a pilot, be transmitted to the ground for fleet monitoring and tracking, and/or be used for any other suitable response. Level exceedance detector 380 may also be implemented using a plurality of basic and empirical approaches.

In various embodiments, oil consumption rate may be configured to be sent to an aircraft's avionics system. An aircraft's avionics system may be configured to receive oil consumption rate, and notify the pilot if the oil consumption rate is outside a defined minimum threshold. In this regard, avionics system may notify the pilot by setting off a light in the cockpit, indicating that the oil quantity is low. Defined minimum threshold may vary depending on the particular engine model on the aircraft. In various embodiments, avionics system may also transmit oil consumption rate to the ground, for fleet monitoring and tracking.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for oil consumption monitoring, comprising:
 an oil tank;
 an engine component configured to receive oil from the oil tank;
 an oil quantity sensor configured to measure a raw oil quantity in the oil tank; and
 a processor operationally coupled to the sensor, wherein the processor is configured to perform operations comprising:
  receiving a signal corresponding to the raw oil quantity from the oil quantity sensor;
  calculating a corrected oil quantity based upon the raw oil quantity and engine environmental factors, wherein the corrected oil quantity accounts for oil within the engine component;

calculating a predicted oil quantity based upon a model;

calculating a prediction error by comparing the corrected oil quantity to the predicted oil quantity, calculating a weighted slope estimate using the prediction error, wherein a first weight is applied to the prediction error during a steady-state condition, and a second weight less than the first weight is applied to the prediction error during a transient condition; and determining an oil consumption rate using the weighted slope.

2. The system of claim 1, further comprising an avionics system, wherein the avionics system is configured to receive the oil consumption rate from the processor.

3. The system of claim 2, wherein the avionics system is configured to activate a light in a cockpit of an aircraft when the oil consumption rate is outside a defined minimum threshold.

4. The system of claim 1, wherein the engine environmental factors comprise at least one of engine operating parameter measurements or aircraft conditions.

5. The system of claim 1, further comprising calculating, by the processor, an aircraft stability estimate using at least one of an engine operating parameter measurement or an aircraft condition.

6. The system of claim 5, further comprising calculating the weighted slope estimate by weighting an influence of individual points using an inverse of the aircraft stability estimate.

7. The system of claim 6, wherein the processor is further configured to generate a rate alert when the weighted slope estimate is outside a defined weighted slope threshold.

8. The system of claim 1, wherein the processor is further configured to generate a level alert when the prediction error is outside a defined prediction error threshold.

9. A method of oil consumption detection, comprising:

receiving, by a processor from an oil quantity sensor, a raw oil quantity corresponding to an amount of oil in an oil tank;

receiving, by the processor, a signal corresponding to an operating parameter measurement of an engine component;

calculating, by the processor, a corrected oil quantity using the raw oil quantity and the operating parameter measurement of the engine component, wherein the corrected oil quantity accounts for oil outside of the oil tank;

calculating, by the processor, a predicted oil quantity by inputting the operating parameter measurement into a model;

calculating, by the processor, a prediction error by comparing the corrected oil quantity to the predicted oil quantity;

determining, by the processor, an aircraft operating state using the operating parameter measurement;

calculating, by the processor, a weighted slope estimate using the prediction error and the aircraft operating state, wherein a first weight is applied to the prediction error during a steady-state condition, and a second weight less than the first weight is applied to the prediction error during a transient condition; and determining, by the processor, an oil consumption rate using the weighted slope.

10. The method of claim 9, further comprising calculating, by the processor, an aircraft stability estimate.

11. The method of claim 10, further comprising calculating the weighted slope estimate by weighting an influence of individual points using an inverse of the aircraft stability estimate.

12. The method of claim 10, wherein the aircraft stability estimate is calculated using airplane operating conditions.

13. The method of claim 9, further comprising, generating, by the processor, a level alert when the prediction error is outside a defined predication error threshold.

14. The method of claim 9, further comprising generating, by the processor, a rate alert when the weighted slope estimate is outside a defined weighted slope threshold.

15. A computer-based system, comprising:

a processor; and a tangible, non-transitory computer readable medium configured to communicate with the processor, the tangible, non-transitory computer readable medium having instructions stored thereon that, in response to execution by the processor, cause the processor to perform operations comprising:

receiving, by the processor from an oil quantity sensor, a raw oil quantity in an oil tank;

calculating, by the processor, a corrected oil quantity using the raw oil quantity and at least one of an engine operating parameter measurement or an aircraft condition;

calculating, by the processor, a predicted oil quantity using the at least one of the engine operating parameter measurement or the aircraft condition;

calculating, by the processor, a prediction error by comparing the corrected oil quantity to the predicted oil quantity;

calculating, by the processor, a weighted slope estimate using the prediction error, wherein a first weight is applied to the prediction error during a steady-state condition, and a second weight less than the first weight is applied to the prediction error during a transient condition; and determining, by the processor, an oil consumption rate of the engine based on the weighted slope.

16. The computer-based system of claim 15, further comprising calculating, by the processor, an aircraft stability estimate using the at least one of the engine operating parameter measurement or the aircraft condition.

17. The computer-based system of claim 16, wherein the calculating the weighted slope comprises weighting an influence of individual points using an inverse of the aircraft stability estimate.

18. The computer-based system of claim 15, wherein the operations further comprise generating, by the processor, a level alert when the prediction error is outside a defined threshold.

19. The computer-based system of claim 15, wherein the processor is further configured to generate a rate alert when the weighted slope estimate is outside a defined threshold.

* * * * *